(12) United States Patent
Agapiou

(10) Patent No.: US 11,063,499 B2
(45) Date of Patent: Jul. 13, 2021

(54) HYBRID MOTOR ROTOR CASTING APPARATUS AND METHOD

(71) Applicant: GM GLOBAL TECHNOLOGY OPERATIONS LLC, Detroit, MI (US)

(72) Inventor: John S. Agapiou, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 202 days.

(21) Appl. No.: 16/412,537

(22) Filed: May 15, 2019

(65) Prior Publication Data

US 2020/0366170 A1 Nov. 19, 2020

(51) Int. Cl.
| | |
|---|---|
| H02K 15/02 | (2006.01) |
| H02K 15/00 | (2006.01) |
| H02K 1/26 | (2006.01) |
| B22D 19/00 | (2006.01) |
| H02K 17/16 | (2006.01) |

(52) U.S. Cl.
CPC ......... H02K 15/02 (2013.01); B22D 19/0054 (2013.01); H02K 1/26 (2013.01); H02K 15/0012 (2013.01); H02K 17/16 (2013.01)

(58) Field of Classification Search
CPC ...... H02K 15/0012; H02K 15/02; H02K 1/26; H02K 17/16; B22D 19/0054
See application file for complete search history.

(56) References Cited

U.S. PATENT DOCUMENTS

| | | | | |
|---|---|---|---|---|
| 5,887,643 | A | * | 3/1999 | Nakamura ......... B22D 19/0054 164/312 |
| 8,643,241 | B2 | | 2/2014 | Kleber et al. |
| 8,910,371 | B2 | | 12/2014 | Kleber et al. |
| 9,083,221 | B2 | | 7/2015 | Kleber et al. |
| 10,038,359 | B2 | | 7/2018 | Hanna et al. |
| 2018/0062486 | A1 | | 3/2018 | Agapiou et al. |

FOREIGN PATENT DOCUMENTS

DE         102013221533 A1 *  4/2014  .......... H02K 17/165

OTHER PUBLICATIONS

Mechler, Gene Collin. Jul. 23, 2010. Thesis: Manufacturing and Cost Analysis for Aluminum and Copper Die Cast Induction Motors for GM's Powertrain and R&D Divisions.

* cited by examiner

*Primary Examiner* — Peter Dungba Vo
*Assistant Examiner* — Jose K Abraham
(74) *Attorney, Agent, or Firm* — Lorenz & Kopf LLP

(57) ABSTRACT

Apparatus and methods are provided for manufacturing a rotor. The rotor has a core with an open center, conductive bars extending across the core and conductive end rings at ends of the core. A mandrel has a body that extends through the open center and a head that extends over and engage the first end of the core around the open center. A central cap couples with the body, extends over and engages the second end of the core around the open center. An end cap covers the central cap and engages the core around the open center. The end cap defines at least part of a cavity around the conductive bars for receiving molten metal.

20 Claims, 8 Drawing Sheets

HYBRID MOTOR ROTOR CASTING APPARATUS AND METHOD

TECHNICAL FIELD

The present disclosure generally relates to the manufacture of electric motor rotors and more particularly, relates to casting apparatus and methods for simplified and effective manufacture of rotors including those employing hybrid copper-aluminum cages.

Induction motors are commonly used in electrical propulsion systems for both hybrid and battery electric vehicles. The motors generally include two main components, a rotor and a wire-wound stator that surrounds the rotor. The conductors of the stator are generally copper while the material used for the conductors of the rotor varies depending on a number of factors and are typically copper or aluminum.

The rotor may include a stack of laminations that are typically made of a ferromagnetic material that may be coated with a non-conducting material. The rotor may also include conducting elements including end rings and conducting bars that run along the stack of laminations in a cage-like configuration. The conducting bars may be inserted into the lamination stack or may be cast along with end rings that are formed at one or both ends of the lamination stack.

A typical rotor manufacturing process includes stacking laminations onto arbor. Each lamination of the rotor may be formed, such as by stamping, with openings around its circumference for receiving uniformly spaced electrical conductor bars that extend along the stack of laminations. The lamination stack is loaded into a mold or casting machine and molten material is introduced. Following casting, the rotor is extracted and the arbor and sprue are removed.

The typical rotor casting process is complicated. A number of factors such as procedures for flux application, entrapment of air or gas, rotor ejection processes, and die design details, compound and lead to complex methods, die designs and quality issues. For example, rotors manufactured using die casting may encounter high rates of excessive porosity Accordingly, it is desirable to provide apparatus and methods for efficiently and effectively manufacturing motor rotors. Furthermore, other desirable features and characteristics of the present invention will become apparent from the subsequent detailed description and the appended claims, taken in conjunction with the accompanying drawings and the foregoing technical field and background.

SUMMARY

In various embodiments, an apparatus is provided for manufacturing a rotor. The rotor has a core with an open center, conductive bars extending across the core and conductive end rings at ends of the core. A mandrel has a body that extends through the open center and a head that extends over and engages the first end of the core around the open center. A central cap couples with the body, and extends over and engages the second end of the core around the open center. An end cap covers the central cap and engages the core around the open center. The end cap defines at least part of a cavity defined around the ends of the conductive bars for receiving molten metal.

In another embodiment, the apparatus includes a die insert that fits over the end cap. The die insert and the end cap together define the cavity.

In another embodiment, the central cap is separated from the cavity by the end cap.

In another embodiment, the head has an outer diameter that is equal to an outer diameter of the central cap.

In another embodiment, the end cap includes a surface configured to engage the core.

In another embodiment, the end cap includes grooves configured as vents.

In another embodiment, the die insert includes bores that register with the grooves.

In another embodiment, the die insert include a surface configured to engage the core.

In another embodiment, the die insert defines a series of sprue openings registering with, and distributed around, the cavity.

In another embodiment, a fluxing fixture defines an aperture configured to receive the head to locate the rotor assembly, and includes a reservoir configured to receive end sections of the conductive bars.

In additional embodiments, a method of manufacturing a rotor includes forming a core having an open center that extends between ends of the core. A mandrel is positioned so that its body extends through the open center between the ends and its head extends over and engages one end of the core around the open center. A number of conductive bars are placed into slots in the core. A central cap couples to the body to extend over and engage an end of the core around the open center. The central cap is covered by an end cap that engages the end of the core around the open center. A molten metal is introduced into a cavity, which is defined at least in-part, by the end cap and which is located around the conductive bars at the second end.

In another embodiment, an end ring is formed from the molten metal. A die insert fits over the end cap so that the die insert and the end cap together define the cavity.

In another embodiment, the central cap is separated from the cavity by the end cap.

In another embodiment, the head and the central cap have outer diameters that are equal.

In another embodiment, a surface of the end cap engages the core.

In another embodiment, gas is vented through grooves in the end cap.

In another embodiment, bores of the die insert register with the grooves.

In another embodiment, a surface of the die insert engages the core.

In another embodiment, flux is applied to ends sections of the conductive bars in a fluxing fixture that defines an aperture configured to receive the head to locate the rotor assembly. The fluxing fixture defines a reservoir configured to receive the end sections of the conductive bars.

In additional embodiments, an apparatus is provided for manufacturing a rotor. The rotor has a core with an open center, conductive bars extending across the core to end sections, and conductive end rings at ends of the core. A mandrel has a body configured to extend through the open center and a head configured to extend over and engage an end of the core around the open center. A central cap couples with the body, and extends over and engages an end of the core around the open center. The central cap has a surface configured to engage the core. One end cap covers the central cap and engages one end of the core around the open center. Another end cap covers the head and engages another end of the core around the open center. One die insert fits over one end cap and another die insert fits over the other end cap. Each die insert and its respective end cap together define a cavity. The cavities are configured to receive respective end sections of the conductive bars and to receive molten metal.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, apparatus and methods of manufacturing rotors for electric motors employ a mandrel system that simplifies rotor fabrication including by facilitating fluxing and simplifying mandrel removal. In addition, air/gas dissipation during casting is enhanced providing consistent results with reduced porosity. In a number of embodiments, a rotor core is assembled with an open center for receiving a shaft. The core may be formed from a number of laminations and may be made of insulated ferromagnetic material. For example, silicon steel may be used to form the laminations. Conductive bars are applied to the core and extend across the core between two ends. The conductive bars may be fabricated from a copper material for enhanced conductivity, or may be another material. The conductive bars may have ends that extend out from the core. A mandrel has a body that extends through the open center and a head that extends over and engages an end of the core around the open center. A central cap couples with the body extends over and engage the other end of the core around the open center. An end cap covers the central cap engages the end of the core. The end cap defines a cavity around the conductive bars for receiving molten metal to form end rings electrically coupled with the conductive bars. The end rings may be cast of an aluminum material. In other embodiments, the ends rings may be cast of another material such as a copper alloy.

The multi-component mandrel system facilitates applying flux to the ends of the conductive bars prior to casting and is readily remove following casting. In addition, the mandrel system design facilitates the inclusion of features to remove air/gas during the casting process reducing porosity and improving quality. The simplified manufacture adds flexibility to rotor end-ring design allowing for more options in shape and configuration.

Figure 1:
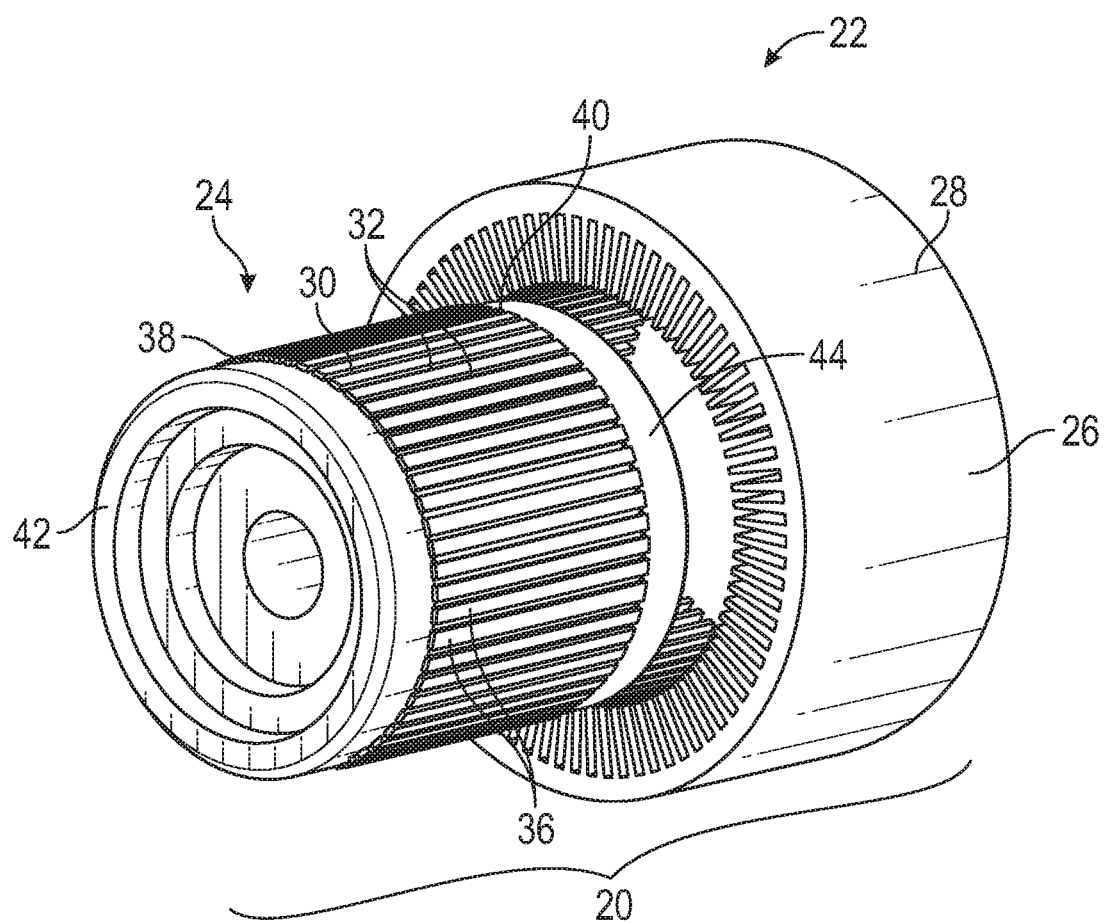
FIG. 1 is a schematic illustration of parts of an induction motor, in accordance with various embodiments.

With reference to FIG. 1, schematically illustrated are select components of an electric motor 20 including a stator assembly 22 and a rotor assembly 24 shown outside the stator for visibility. In this embodiment, the motor 20 is configured as an induction motor in which the current in the rotor assembly 24 that produces torque is induced from the magnetic field created by energization of the stator assembly 22. In particular, the motor 20 is an alternating current machine suitable for use as a traction motor in a vehicle, although this disclosure is not limited to those applications.

The stator assembly 22 is a generally annular shaped component, which may be constructed for single-phase power or multiple phase power such as, three-phase. In this embodiment, the stator assembly 22 includes a core 26 made of a stack of laminations 28. The laminations 28 may be formed by stampings that are slotted to receive windings (not shown), and are made of a ferromagnetic material such as silicon steel. The laminations 28 may be insulated from one another by a thin non-conductive coating. In other embodiments, another ferromagnetic material may be used.

The rotor assembly 24 includes a core 30 formed from a stack of laminations 32 configured to receive a shaft (not shown). The laminations 32 are stamped with parallel slots 34 (FIG. 2), for receiving the rotor conductors, which in this embodiment are configured as conductive bars 36. The laminations 32 are made of a ferromagnetic material and may be insulated from one another by a thin non-conductive coating, or may be made of another material. The conductive bars 36 are inserted into, or otherwise applied to the slots 34 and extend from one end 38 of the core 30 to the other end 40. In the current embodiment, the conductive bars 36 are fabricated from a copper material for good conductivity. End rings 42, 44 are formed at the ends 38, 40 of the core 30 and are electrically coupled with the conductive bars 36. In the current embodiment, the end rings 42, 44 are fabricated of an aluminum material for light weight. As such, the rotor 24 may be termed an copper-aluminum hybrid. The rotor assembly 24 may include a skew with the laminations 32 shifted slightly from end-to-end to angle the conductive bars 36, which is intended to reduce harmonic imbalances. The rotor's conductive bars 36 and conductive end rings 42, 44 form a cage-like configuration and may be called a shorted structure.

Figure 2:
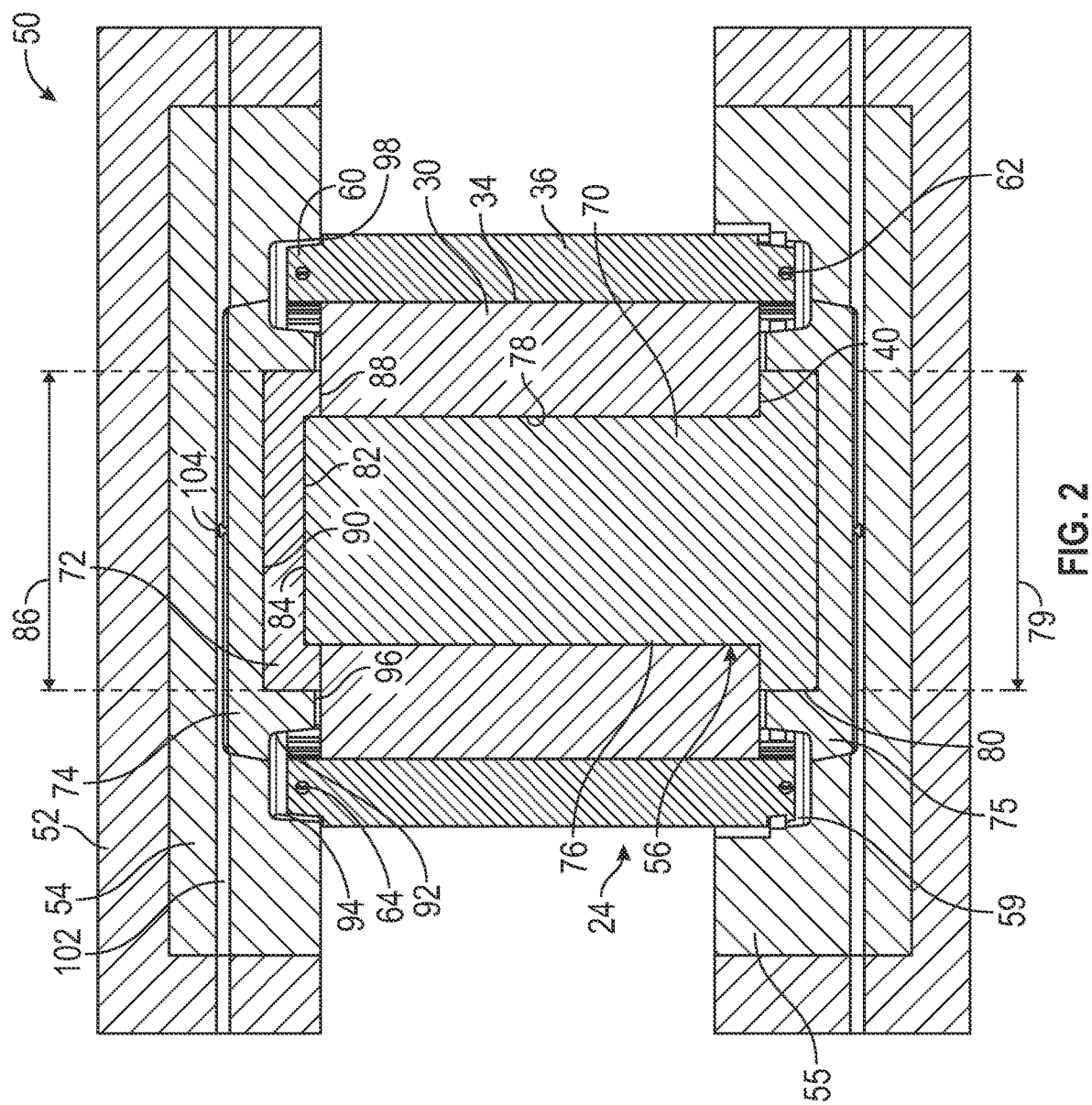
FIG. 2 is a fragmentary, cross sectional illustration of an apparatus for manufacturing a rotor, in accordance with various embodiments.

In FIG. 2, an apparatus 50 is shown for use in manufacture of the rotor assembly 24. The apparatus 50 is configured for use in a casting phase of the manufacture of the rotor assembly 24, which in this embodiment employs die casting. As part of the casting process, the end rings 42, 44 (FIG. 1), are formed from introduced molten aluminum and are simultaneously electrically coupled with the conductive bars 36.

A challenge in rotor die casting is to avoid excess porosities due to entrapment of air/gas in molten metal during mold fill and cooling, which may unintentionally remain in the end rings 42, 44 as defects after solidification. It has been found that there is a propensity for this to occur at the inner diameter section of end-rings 42, 44. In addition, flux is required to ensure good electrical coupling between the conductive bars 36 and the end rings 42, 44. Gasification of the flux material may add to gas generation in the mold. Therefore, avoiding over-fluxing is beneficial. The accurate application of flux may also be challenging. Also, it has been found that molten aluminum flash may penetrate gaps making it difficult to eject the rotor assembly 24 from the die and to remove the mandrel from the cast rotor. The apparatus 50 addresses these and other challenges to efficiently manufacture quality rotors.

In general, the apparatus 50 includes a die cast machine 52, with a die insert 54, a die section 55 and a mandrel system 56, each of which is configured to mate with the rotor assembly 24. The die cast machine 52 is configured to force molten metal under pressure into a cavity 58. A second cavity 59 may be filled at this same stage. The cavities 58, 59 are designed to form the end ring 42, 44 (FIG. 1). The in-process rotor assembly 24 is positioned between the die insert 54 and the die section 55. The die insert may also be configured similar to the die insert 54. At this stage the rotor assembly 24 includes the core 30, and the conductive bars 36. Ejector pins (not shown) may extend through the die section 55 for ejecting the rotor assembly 24 along with the mandrel system 56 after casting. Each conductive bar 36 includes end sections 60, 62 that extend beyond the core 30 at the ends 38, 40. The end sections 60, 62 are arranged around the core 30 in a circle at each end 38, 40 and each includes an opening 64 that extends through its respective conductive bar 36. This presents the end sections 60, 62 in an annular arrangement that extends/projects from its respective end 38, 40.

The rotor assembly 24 is positioned and contained in the die cast machine 52 with assistance from the mandrel system 56. The mandrel system 56 includes a mandrel 70, a central cap 72, and an end cap 74. The mandrel 70 includes a body 76 that is cylindrical in shape and is configured to extend through the open center 78 of the core 30 from the end 40 to the end 38. The body 76 has a diameter sized to fit closely within the open center 78. The mandrel 70 also includes a head 80 that is integral with the body 76 and that has a diameter 79 larger than that of the body 76 to extend over and engage the end 40 of the core 30 around the open center 78.

The central cap 72 is generally disk shaped and includes a round depression 82 that receives the end 84 of the body 76. The central cap 72 has a diameter 86 that, in this embodiment, is equal to the diameter 79 of the head 80 and an annular surface 88 that engages the end 38 of the core 30. In other embodiments, the diameters may differ. The central cap 72 is configured to couple with the body 76 with the end 84 in the depression 82 and to extend over and engage the end 38 of the core 30 around the open center 78. In this embodiment, the rotor assembly 24 together with the mandrel 70 and the central cap 72, form a symmetrical assembly.

The end cap 74 is generally disk shaped and includes a center opening 90 that extends partially through and receives the central cap 72. The end cap 74 is received within a circular recess 91 of the die insert 54. The end cap 74 includes a fillet 92 that is a concave section at its outer perimeter and that cooperates with the die insert 54 to define the cavity 58. For this purpose, the die insert 54 includes a mating fillet 94 so that the end sections 60 of the conductive bars 36 are disposed in the cavity 58. The end cap 74 is configured to cover the central cap 72 and includes a surface 96 between the center opening 90 and the fillet 92. The surface 96 engages the end 38 of the core 30 around the open center 78. The die insert 54 includes a surface 98 that engages the end 38 of the core 30 on the outboard side of the end sections 60 so that the cavity 58 is sealed for receiving molten metal. The die insert 54 also includes openings in the form of intersecting cross bores 102, 104 for venting purposes. The cross bores 102, 104 extend through the recess 91, and take the form of grooves in the die insert 54 within the recess 91. The head 80 is received in a second end cap 75, which is disposed in the die section 55 and which is similar to the end cap 74.

Figure 3:
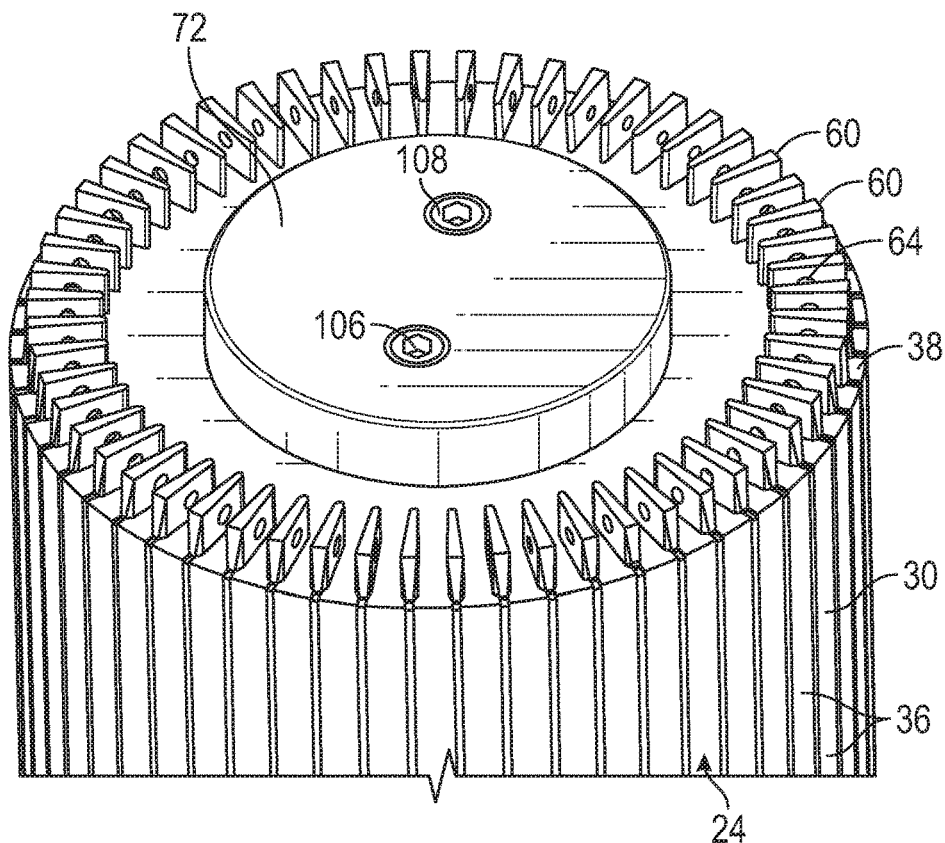
FIGS. 3, 4 and 5 are perspective illustrations of a rotor at various stages of manufacture, in accordance with various embodiments.
Figure 4:
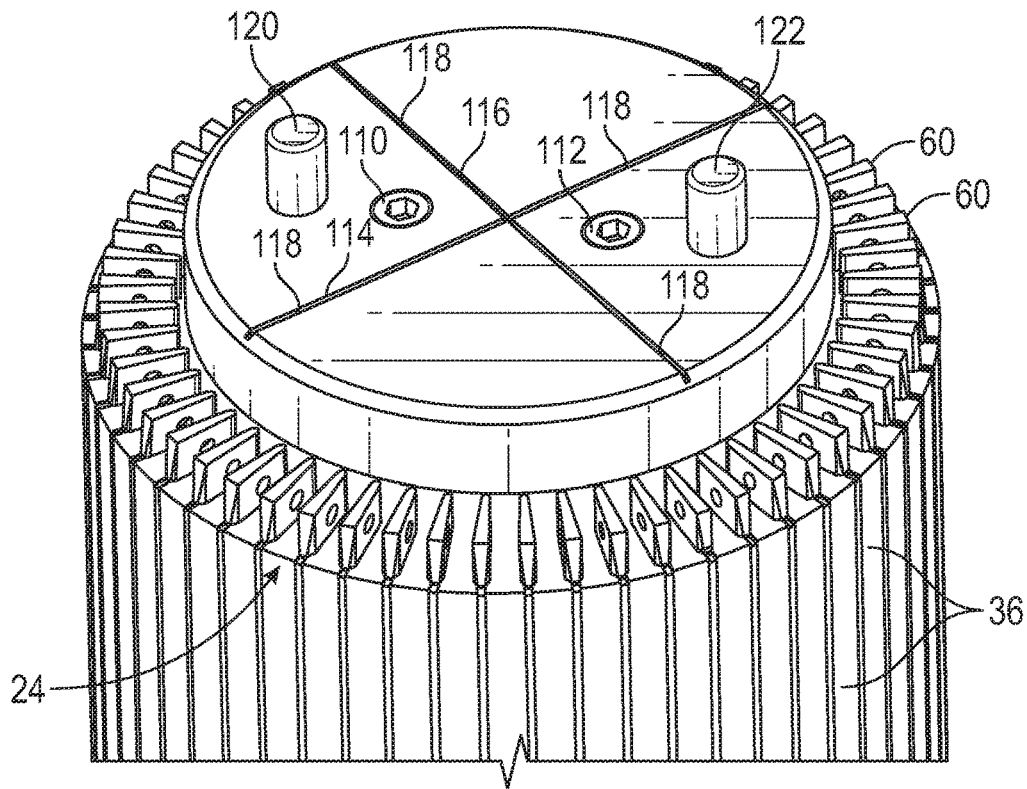

Referring to FIG. 3, the rotor assembly 24 is shown from the perspective of end 38 prior to casting the end ring 42. The central cap 72 is shown attached to the body 76 of the mandrel 70 (shown in FIG. 2), by a pair of fasteners 106, 108. The central cap 72 covers the body 76 of the mandrel 70 and secures the mandrel 70 to the rotor assembly 24. As shown in FIG. 4, in an additional step the end cap 74 has been added to the rotor assembly 24 and is secured to the central cap 72 by a pair of fasteners 110, 112. The end cap 74 covers the central cap 72, which as a result isn't exposed to molten metal during casting. The end cap 74 includes a pair of intersecting grooves 114, 116, that register with the cross bores 102, 104 (FIG. 2) of the die insert 54 within the recess 91. The end cap 74 includes a number of openings in the form of bores 118 that register with the grooves 114, 116 and extend through to the central cap 72. During casting, expanding air and gases from the cavity 58 may escape through one or more of the bores 118, the grooves 114, 116 and the cross bores 102, 104, so that the air/gas does not add porosity to the cast components. The end cap 74 carries a pair of alignment pins 120, 122 to align the end cap 74 with the die insert 54 and the vent features.

Figure 5:
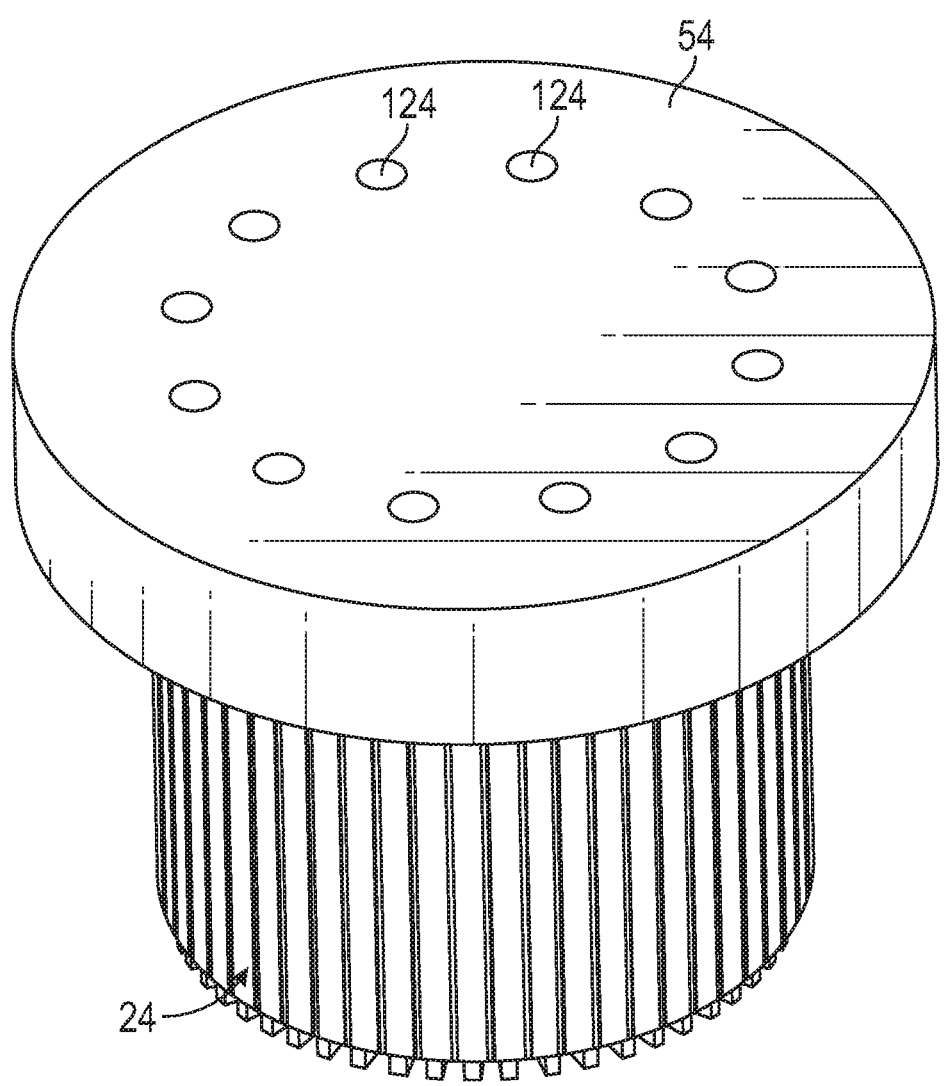

As shown in FIG. 5, the rotor assembly 24 with the mandrel system 56 fits within the die insert 54. While in some embodiments the die insert 54 may be coupled with the rotor assembly 24 prior to insertion into the die cast machine 52, in general the die insert 54 is carried by the die cast machine 52 as part of a larger die and the rotor assembly 24 is loaded into the die insert 54 while in the die cast machine 52. FIG. 5 shows sprues 124 of the gating system, which provide passages through which molten metal is introduced during casting. The sprues 124 are distributed around the circumference of the cavity 58 to evenly and quickly distribute the cast material.

Figure 6:
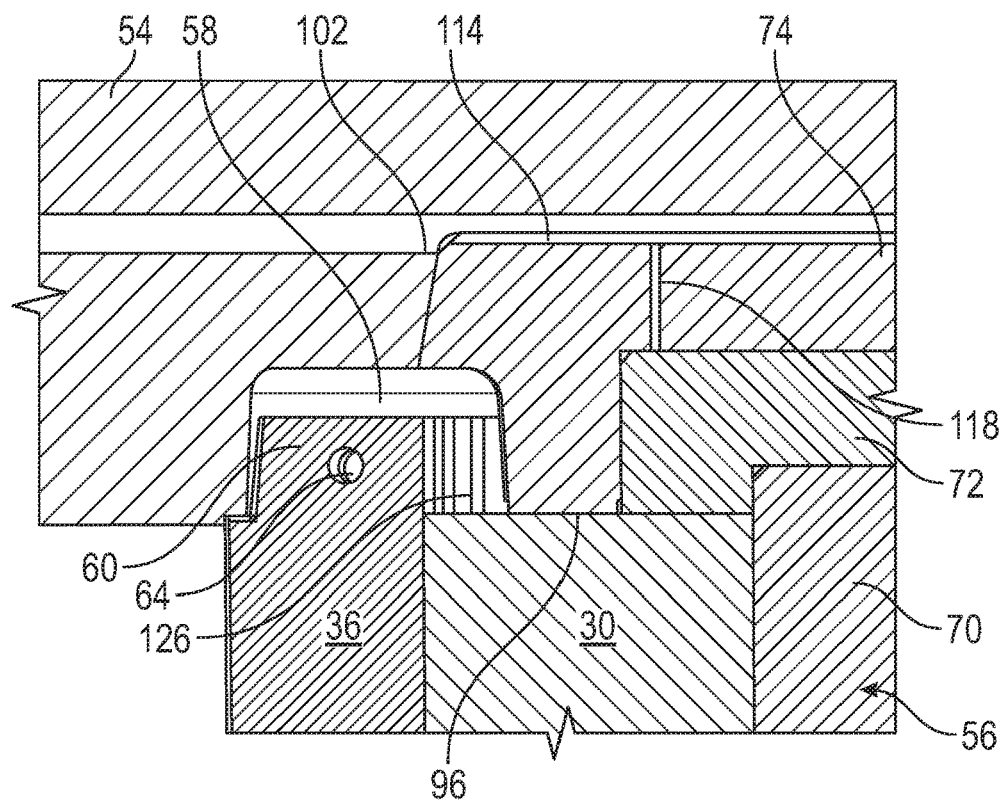
FIG. 6 is a fragmentary, cross sectional illustration of an apparatus for manufacturing a rotor.

Features of the air/gas venting system is shown in FIG. 6 in greater detail. During casting, as molten metal is injected into the cavity 58, air/gas may escape through the bore 118, the groove 114 and the cross bore 102. The design of the multi-component mandrel system 56 enables the inclusion of narrow channels that effectively remove the air/gas generated during the die casting process without providing openings directly to the cavity 58 through which flash would escape. For example, the air/gas may escape between the surface 96 and the core 30. The area for escape is particularly beneficial because the inner diameter section 126 of the cavity 58 has been found to be an area where excessive porosity has been found in the cast elements. The defined vent paths and the use of an end cap 74 in combination with the central cap 72 helps keep flash away from the fasteners 106, 108, 110, 112 simplifying removal of the mandrel system 56 from the rotor assembly 24 after casting. In particular, molten metal is prevented from flowing under the central cap 72 facilitating removal of the mandrel system 56 after casting.

Figure 7:
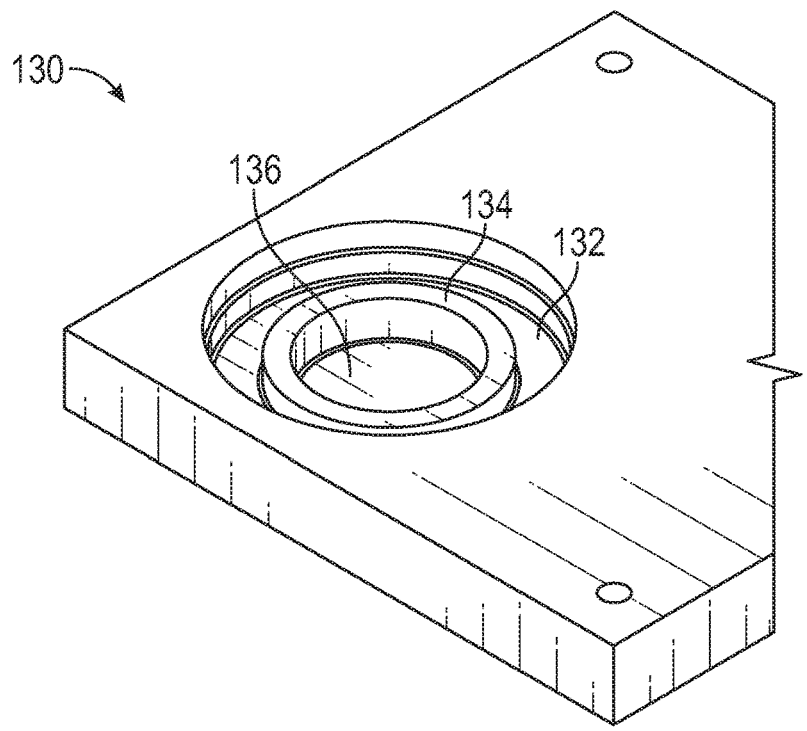
FIG. 7 is part of the apparatus for flux application, in accordance with various embodiments.
Figure 8:
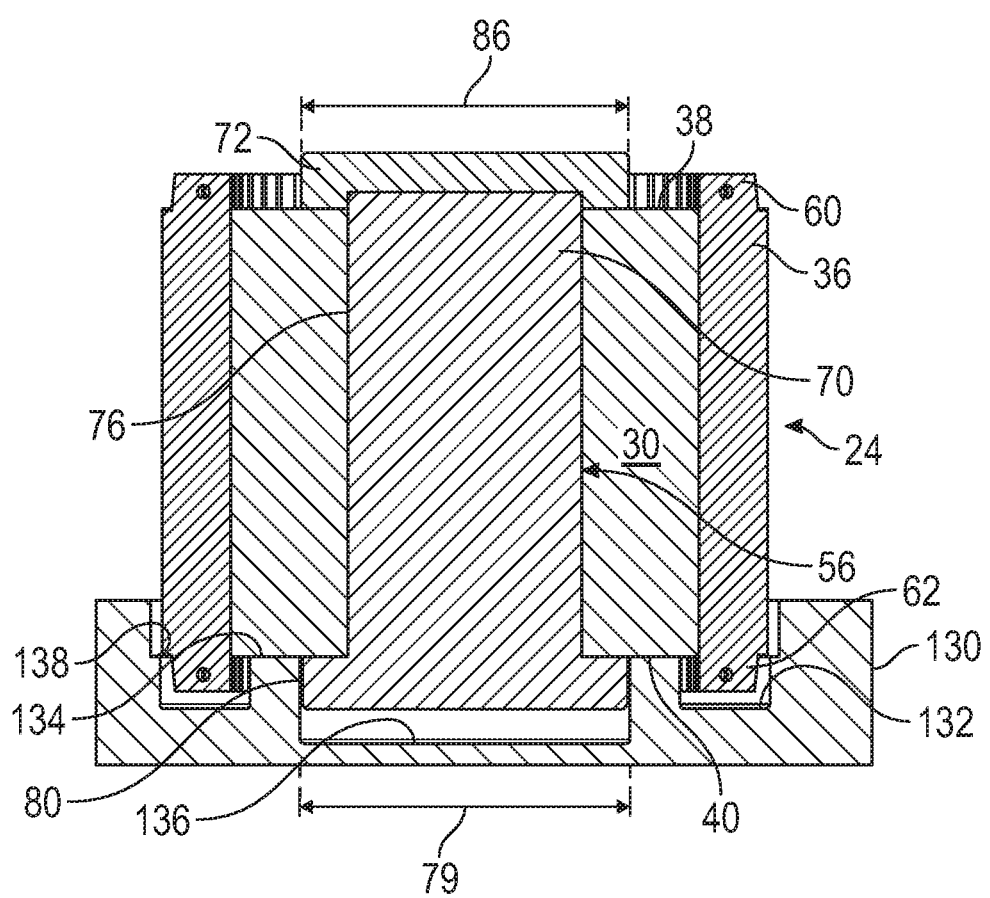
FIG. 8 is a schematic illustration of flux application to a rotor using the apparatus of FIG. 7, in accordance with various embodiments.

A fluxing fixture 130 is illustrated in FIG. 7 and facilitates uniformly applying flux to only the end sections 60, 62 of the conductive bars 36. The fluxing fixture 130 may be a part of a larger machine that may include automated features such as for delivering flux, positioning the rotor assembly 24 or for otherwise facilitating production. The fluxing fixture 130 generally includes an annular reservoir 132, an annular wall 134 and a round aperture 136. As shown pre-casting in FIG. 8, the rotor assembly 24 is connected with the mandrel 70 and the central cap 72 as a unit. In this state, the unit is symmetrical at the ends 38, 40 of the core 30. Therefore, the end sections 60, 62 may both be fluxed without removal of the mandrel system 56 from the rotor assembly 24. Flux is delivered to the annular reservoir 132 and filled up to an indicator step 138. The rotor assembly 24 is inserted into the fluxing fixture 130 with the head 80 fitting into the aperture 136, which locates the end sections 62 in the reservoir 132. The end 40 of the core 30 contacts the wall 134 locating the depth of the end sections 62 and avoiding over-fluxing. It will be appreciated that the rotor assembly 24 may be inverted and the end section 60 fluxed with the central cap 72 locating within the aperture 136.

Figure 9:
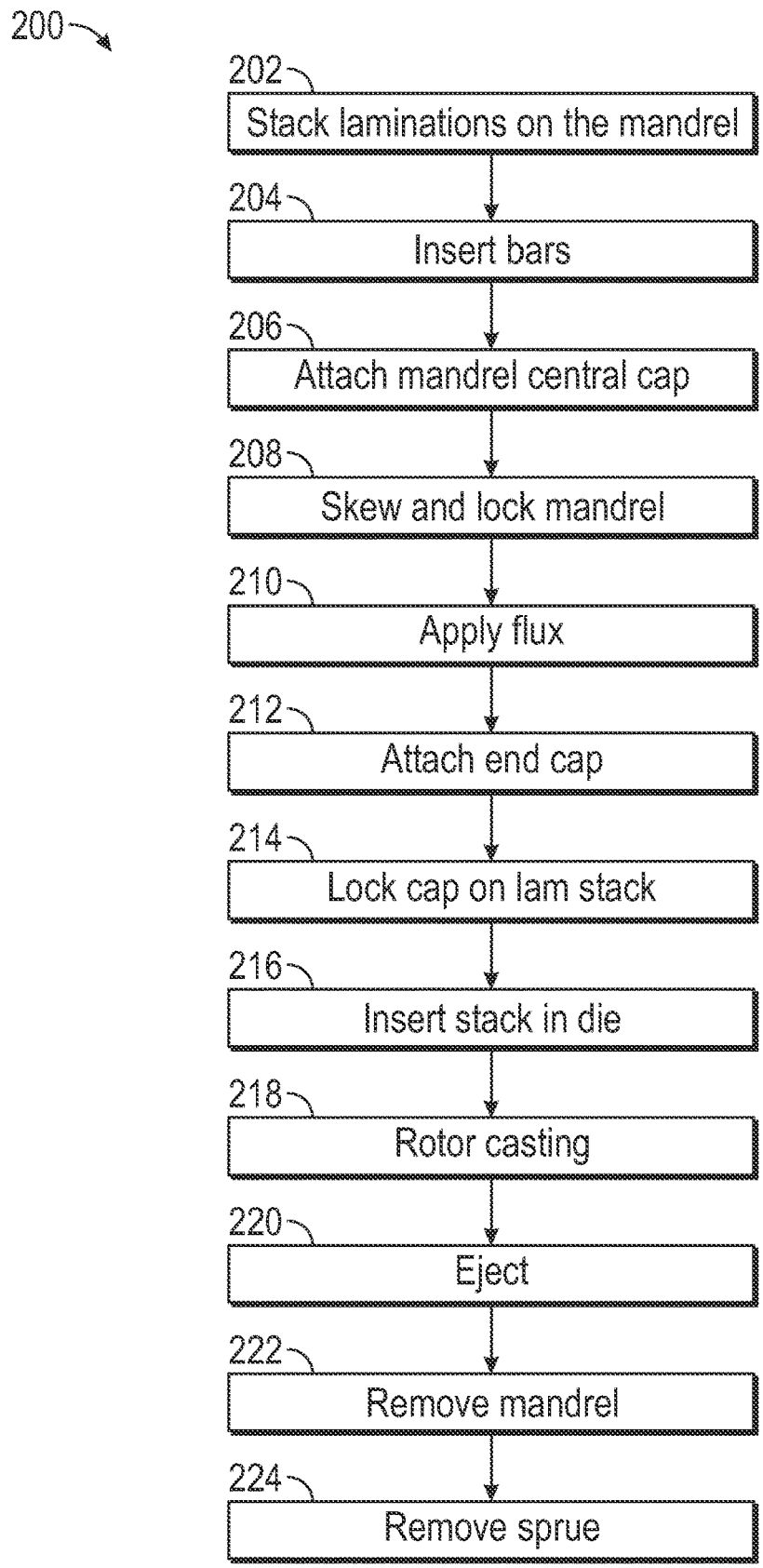
FIG. 9 is a flow chart illustrating a process that may be performed using the apparatus of FIGS. 2-8, in accordance with various embodiments.

A process 200 for manufacturing the rotor assembly 24 is illustrated in FIG. 9. The desired number of laminations 32 are stacked 202 on the mandrel 70 to form the core 30 of the rotor assembly 24. The conductive bars 36 are inserted 204 into the slots 34. A slight interference fit may be used to hold the conductive bars 36 in location, or they may be secured by other chemical or mechanical means. The central cap 72 is positioned over the end 84 of the mandrel 70 and lightly secured thereto at step 206 such as by fasteners 106, 108. This desirably compresses the stack of laminations 32 and secures them for further processing. An amount of skew is introduced 208 to the stack by slightly twisting the laminations 32 such as in a skew fixture (not shown) and the fasteners are torqued to lock the stack in place. With the in-process rotor assembly 24 contained by the mandrel 70 and central cap 72, flux is applied 210 to the end sections 60 and/or 62 of the conductive bars such as in the fluxing fixture 130. The flux is prepared with a viscosity and adheres to remain in place when applied to the end sections 60, 62. The end cap 74 is oriented and placed 212 over the central cap 72 and secured in place 214 such as by the fasteners 110, 112. The in-process rotor assembly 24 is loaded 216 into the die of the die cast machine 52 with the end cap 74 received in the die insert 54 and with the head 80 received in the die section 55. A shot of molten metal is introduced 218 through the sprues 124 and into the cavity 58 forming the end ring 42 and/or 44. During casting, air and gases may escape through one or more of the bores 118, the grooves 114, 116 and the cross bores 102, 104. The rotor assembly is ejected 220, the mandrel system is removed 222, and any excess sprue material is removed 224 such as by machining.

Figure 10:
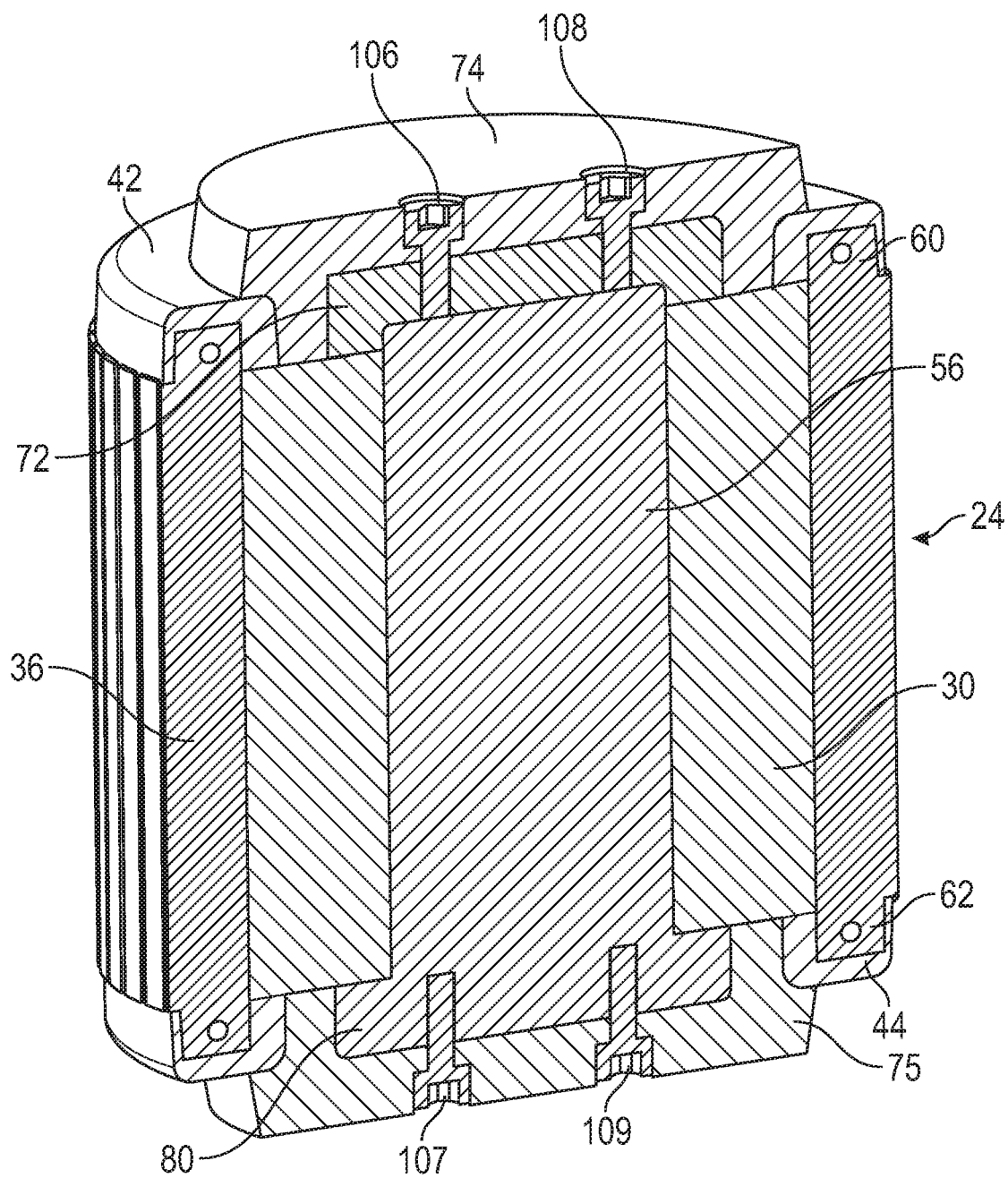
FIG. 10 is a cross sectional illustration of a rotor, in accordance with various embodiments.

FIG. 10 illustrates the rotor assembly 24 following casting of both end rings 42, 44 prior to removal of the mandrel system 56. As shown, the head 80 serves as a second central cap and the similar end cap 75 is secured over the head 80 such as by fasteners 107, 109. The end caps 74, 75 may be interchangeable with each other. In some embodiments, one or both may be configured for ejector pins. In embodiments where both end rings 42, 44 are cast at the same stage, the end cap 75 is received in the die section 55 at the second side of the die cast machine 52. The cast material of the end rings 42, 44 is integrated with the conductive bars 36. The end caps 74, 75 may include draft angles for easy removal. The central cap 72 and the mandrel 70 are readily removed because they are shielded from molten metal by the end caps 74, 75. The diameter of end rings 42, 44 may shrink during cooling, and the mandrel system 56 avoids potential snagging or sticking.

Accordingly, apparatus and methods of manufacturing rotors for electric motors employ a multi-component mandrel system that simplifies rotor fabrication including by facilitating fluxing and simplifying mandrel removal. The mandrel system includes an end cap that covers a central cap and defines the inner section of the end ring cavity. The outer section of the end ring cavity is defined by a separate die insert that includes part of the casting gating system. The mandrel system design supports the incorporation of narrow channels to remove the air/gas during casting providing consistent results. The mandrel system facilitates uniform fluxing at the ends of the conductive bars avoiding over-fluxing, which substantially reduces the generation of gas bubbles at the intermetallic zone around the bars in the end rings.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus for manufacturing a rotor that has a core with an open center and first and second ends, conductive bars extending across the core and a conductive end ring configured to be formed in a casting machine, the apparatus comprising:
    a mandrel having a body configured to extend through the open center from the first end to the second end and a head configured to extend over and engage the first end of the core around the open center;
    a central cap configured to couple with the body and to extend over and engage a first portion of the second end of the core around the open center; and
    an end cap configured to contact and to cover the central cap and to engage a second portion of the second end of the core around the open center,
    wherein the end cap, the central cap and the mandrel are configured to be fixed to the core prior to insertion in the casting machine;
    wherein the end cap is configured to define at least part of a cavity around the conductive bars at the second end for receiving molten metal to form the conductive end ring,
    wherein the end cap is configured to separate the central cap from the cavity so that molten metal is prevented from reaching the central cap.

2. The apparatus of claim 1, comprising a die insert that fits over the end cap, wherein the end cap fits within a circular recess of the of the die insert, wherein the die insert and the end cap together define, in entirety, the cavity.

3. The apparatus of claim 2, wherein the central cap defines a round depression that receives the body of the mandrel.

4. The apparatus of claim 1, comprising a second end cap, wherein the head has a first outer diameter and the central cap has a second outer diameter, wherein the first and second outer diameters are equal, wherein the first and the second end caps are identical.

5. The apparatus of claim 1, comprising a die insert that fits over the end cap, wherein the end cap fits within a recess of the of the die insert, wherein the end cap includes a first surface that engages the end of the core around the open center and wherein the die insert includes a second surface that engages the end of the core on an outboard side of the conductive bars so that the cavity is sealed for receiving molten metal.

6. The apparatus of claim 5, wherein the end cap defines a center opening that extends partially through the end cap and that receives the central cap, wherein the end cap includes grooves configured as vents and bores that register with the grooves and open into the center opening.

7. The apparatus of claim 6, wherein the die insert includes cross bores that register with the grooves, wherein the cross bores extend through the recess and comprise grooves in the die insert within the recess.

8. The apparatus of claim 1, comprising a die insert that fits over the end cap, and alignment pins extending into and aligning the end cap and the die insert.

9. The apparatus of claim 1, comprising a die insert that fits over the end cap, wherein the die insert defines a series of sprue openings registering with, and distributed around the cavity.

10. The apparatus of claim 1, comprising a fluxing fixture that defines annular reservoir, a round aperture and a wall between the annular reservoir and the round aperture, the round aperture configured to receive the head to locate the rotor relative to the fluxing fixture and a reservoir configured to receive end sections of the conductive bars within the annular reservoir.

11. A method of manufacturing a rotor with a conductive end ring formed in a casting machine, the method comprising:
   forming a core having an open center that extends from a first end to a second end of the core;
   positioning a mandrel with a body extending through the open center from the first end to the second end and a head extending over and engaging the first end of the core around the open center;
   placing a number of conductive bars into slots in the core;
   coupling a central cap to the body to extend over and engage a first portion of the second end of the core around the open center; and
   covering the central cap with an end cap that contacts and engages a second portion of the second end of the core around the open center;
   fixing the end cap, the central cap and the mandrel to the core prior to insertion in the casting machine;
   separating, by the end cap, the central cap from a cavity so that molten metal is prevented from reaching the central cap;
   introducing the molten metal into the cavity as defined by the end cap around the conductive bars at the second end.

12. The method of claim 11, comprising forming the end ring from the molten metal, wherein a die insert fits over the end cap, wherein the die insert and the end cap together define the cavity.

13. The method of claim 12, comprising fitting the end cap within a circular recess of the die insert.

14. The method of claim 11, comprising configuring the head with a first outer diameter that is equal to a second outer diameter of the central cap.

15. The method of claim 11, comprising engaging the core with a surface of the end cap.

16. The method of claim 15, comprising venting gas through grooves in the end cap.

17. The method of claim 16, comprising registering bores of the die insert with the grooves.

18. The method of claim 11, comprising engaging the core with a surface of the die insert.

19. The method of claim 11, comprising applying flux to end sections of the conductive bars by a fluxing fixture that defines an aperture configured to receive the head to locate the rotor and a reservoir configured to receive the end sections of the conductive bars.

20. An apparatus for manufacturing a rotor that has a core with an open center, conductive bars extending across the core to end sections, and conductive end rings at first and second ends of the core, the apparatus comprising:
   a mandrel having a body configured to extend through the open center from the first end to the second end and a head configured to extend over and engage the first end of the core around the open center;
   a central cap configured to couple with the body and to extend over and engage a first portion of the second end of the core around the open center, the central cap having a surface configured to engage the core;
   an end cap configured to contact and to cover the central cap and to engage a second portion of the second end of the core around the central cap; and
   a die insert that fits over the end cap, wherein the die insert and the end cap together define a cavity;
   wherein the cavity is configured to receive an end section of the conductive bars and for receiving molten metal,
   wherein the end cap separates the central cap from the cavity preventing molten metal from reaching the central cap,
   wherein the end cap, the central cap and the mandrel are configured to be fixed to the core prior to insertion in the casting machine.

\* \* \* \* \*